United States Patent
Nakasogi et al.

(10) Patent No.: US 6,862,064 B2
(45) Date of Patent: Mar. 1, 2005

(54) LIQUID CRYSTAL DEVICE, FABRICATING METHOD, AND FABRICATING APPARATUS THEREOF

(75) Inventors: Teruhiro Nakasogi, Shiga-ken (JP); Tetsuya Nogami, Ohtsu (JP); Kohji Murayama, Moriyama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/763,307

(22) Filed: Jan. 23, 2004

(65) Prior Publication Data

US 2004/0150775 A1 Aug. 5, 2004

Related U.S. Application Data

(62) Division of application No. 09/769,074, filed on Jan. 25, 2001, now Pat. No. 6,734,937.

(30) Foreign Application Priority Data

Feb. 3, 2000 (JP) ........................................ 2000-026263

(51) Int. Cl.[7] ............................................. G02F 1/1337
(52) U.S. Cl. ...................... 349/130; 349/124; 349/126; 427/553
(58) Field of Search ................................ 349/124, 126, 349/130; 427/553

(56) References Cited

U.S. PATENT DOCUMENTS 5,710,609 A    1/1998   Shimada
6,013,335 A  * 1/2000   Hirata et al. ................. 427/553
6,097,463 A  * 8/2000   Chen .......................... 349/130
6,191,836 B1 * 2/2001   Woo et al. ................... 349/124

FOREIGN PATENT DOCUMENTS

JP          9-146060        6/1997

* cited by examiner

Primary Examiner—Huyen Ngo
(74) Attorney, Agent, or Firm—Scully, Scott, Murphy & Presser; Derek S. Jennings

(57) ABSTRACT

To provide a liquid crystal device having a uniform vertical alignment, a method for fabricating it easily, and its fabricating apparatus in fabricating an ECB-type vertically aligned liquid crystal device, a liquid crystal device includes liquid crystal molecules 12 each having a negative dielectric anisotropy and polyimide films for homogeneous alignment, wherein a method for fabricating a liquid crystal device including a process of vertically orienting liquid crystal molecules is constructed by exposing the liquid crystal molecules to light from either or both sides of substrates 14 of the liquid crystal device whose liquid crystal molecules each having a negative dielectric anisotropy are homogeneously oriented using polyimide films for homogeneous alignment. In addition, an aligner used for exposure is equipped with a filer so as to cut light having wavelengths of 400 nm or less and 600 nm or more, so that light having a wavelength of 400 to 600 nm can be utilized. In this liquid crystal device, the response time becomes faster when a voltage is applied between electrodes 16.

16 Claims, 8 Drawing Sheets

LIQUID CRYSTAL DEVICE, FABRICATING METHOD, AND FABRICATING APPARATUS THEREOF

RELATED APPLICATIONS

This application is a divisional of U.S. application Ser. No. 09/769,074, filed Jan. 25, 2001, now U.S. Pat. No. 6,734,937.

BACKGROUND OF THE INVENTION

1. Technical Field

The present invention relates to a liquid crystal device, a fabricating method, and a fabricating apparatus thereof. More particularly, it relates to a method for fabricating an electrically-controlled birefringence effects-type vertically aligned liquid crystal device.

2. Prior Art

Electrically-controlled birefringence effects (hereinafter referred to as ECB)-type vertically aligned liquid crystal devices change wavelength dispersion characteristics, quantity of transmitted light, and color of transmitted light by changing the birefringence rate of nematic liquid crystal wherein its molecular orientation is changed in an electric field. Generally, in the ECB-type vertically aligned liquid crystal devices, transparent electrodes are formed on glass substrates by the evaporation or sputtering method, and the like. Alignment films for vertical alignment are deposited on the transparent electrodes, and the above two glass substrates are assembled so that the alignment films may face each other to fill a liquid crystal material having a negative dielectric anisotropy between the glass substrates. Further, polarizers or polarizer films are mounted on the outside of the glass substrates.

As shown in FIG. 8(a), when no voltage is applied, liquid crystal molecules 12 respectively have a pretilt angle of about 86 to 89 degrees. A pretilt angle means an angle which tilts to a substrate. In FIGS. 8(a) and 8(b), substrates and electrodes are omitted. Further, when the pretilt angle is previously adjusted to be 90 degrees (perpendicular to the substrate), it is not fixed to which direction the liquid crystal molecules 12 are tilted at the time of applying a voltage across the transparent electrodes. For this reason, it is natural to previously have a pretilt angle which is a little more oblique than 90 degrees. In this situation, incident light (Arrow mark in the drawing) is not affected by the birefringence of a liquid crystal medium, and the polarization axis of incident light is not changed, therefore, the incident light cannot pass a second polarizer 76. Because light is shielded by the second orthogonal polarizer 76 due to orthogonal arrangement of the polarization axes of the first orthogonal polarizer 74 and the second orthogonal polarizer 76. Furthermore, film-like polarizer films other than plate-like polarizers can be used for the first orthogonal polarizer 74 and the second orthogonal polarizer 76. Accordingly, when no voltage is applied, a black color is displayed.

Next, when a voltage is applied between the transparent electrodes, as shown in FIG. 8(b), the liquid crystal molecules 12 are tilted. This utilizes the property of the liquid crystal molecules each having a negative dielectric anisotropy to vertically orient in a direction of the electric field. Since the light which has launched into the liquid crystal material becomes elliptically polarized light by the effect of optical anisotropy of the liquid crystal molecules 12, light partially passes the second orthogonal polarizer 76.

There are two methods for an alignment technique to allow all liquid crystal molecules to have a uniform inclination, permitting the orientation of the liquid crystal molecules which is substantially perpendicular to a substrate when the electric field is controlled; (A) a method for forming alignment films which are vertically aligned by a rubbing treatment, (B) a method for forming alignment films by depositing a metallic compound such as silicon oxide and the like on each transparent electrode formed on a substrate. The method (A) for forming alignment films which are vertically aligned by the rubbing treatment is used for applying polyimide films for vertical alignment, and the like, which are alignment films for vertical alignment, onto the transparent electrodes formed on the substrates. Performing the rubbing treatment on the alignment films formed by the above mentioned polyimide films for vertical alignment orients all of the liquid crystal molecules in a predetermined direction. Using this method, the liquid crystal molecules may respectively have a pretilt angle (86 to 89 degrees) which is a little more inclined than a right angle with respect to the substrate.

The method (A) for forming vertically aligned alignment films by the rubbing treatment has, however, difficulties in controlling parameters at the time of rubbing treatment. The reason is that the parameters at the time of rubbing treatment are combinations of parameters experimentally found out, such as the quality of wool of the cloth, pushing depth of wool (actually the degree of a bend of wool), rotational speed of a roller, travel speed of the substrate, rubbing frequency, and rubbing pressure, or the like. Further, an addition of parameters depending on the kind of the alignment film material to the above-mentioned parameters makes parameter control difficult at the time of rubbing treatment. For example, when a streak (flaw) in the rubbing direction caused by rubbing is large, degradation of display quality may occur, more particularly, there is a possibility for the steak to be caused in a liquid crystal display. In addition, when rubbing strength (pushing depth of wool) is weak, the streak in the rubbing direction becomes shallow, and the orientation of the liquid crystal molecules are not uniform, which results in defects of liquid crystal devices.

Next, in the method (b) for forming alignment films by depositing a metallic compound such as silicon oxide on each transparent electrode formed on a substrate, a metallic oxide, such as silicon oxide, is evaporated onto the transparent electrode within a vacuum apparatus to form a column-like structure on the transparent electrode as an alignment film. This method can adjust the pretilt angle of the liquid crystal molecules to be substantially normal by making the direction of the column-like structure to be substantially vertical to the transparent electrode due to the control of the incident angle of a deposited beam with respect to the transparent electrode.

Since the method for forming alignment films by deposition has difficulties in forming a column-like structure having a uniform inclination on the transparent electrode when its deposition space is wide, its uses are limited to small sized substrates. For this reason, the substrate which has become commercially practical is 2 to 3 cm per side. Although a method for improving its uniformity by rotating a substrate while the deposition has been disclosed, but it has not become commercially practical so far. Further, due to weak alignment control, alignment abnormalities are easily caused by impurities from peripheral sealing materials, and the like.

Thus, it is difficult to fabricate ECB-type vertically aligned liquid crystal devices each having a uniform vertical alignment, so that only small-size liquid crystal devices have been partially produced so far.

The inventor of the present invention found Japanese Laid Open Patent Publication No.9-146060 in his search for prior art made in prior to the application. The patent publication discloses a method for making defective portions of liquid crystal materials inconspicuous by irradiating laser light onto the defective portions (illuminance) of the liquid crystal materials so that the liquid crystal materials each having homogeneously aligned positive dielectric anisotropy may be vertically aligned, assuming that the above-mentioned defective potions are demerit points. This method was unable to be used for fabricating a vertically aligned liquid crystal device, although the method was able to be used for repairing defective portions of homogeneously aligned liquid crystal materials.

It is an object of the present invention to provide a large-space liquid crystal device having a uniform vertical alignment, a method for fabricating it easily, and its fabricating apparatus in fabricating an ECB-type vertically aligned liquid crystal device.

SUMMARY OF THE INVENTION

The liquid crystal device according to the present invention comprises a pair of substrates, electrodes, formed on each one side of the substrates, alignment films for homogeneous alignment, formed on the electrodes and facing each other by a uniform space, and a liquid crystal material including liquid crystal molecules each having a negative dielectric anisotropy, the liquid crystal material filled in a gap formed between the alignment films. The liquid crystal device may include plate-like polarizers disposed on the opposite side of each electrodes, which are plate-like polarizers or film-like polarizer films. When no voltage is applied between the electrodes, the liquid crystal molecules are vertically aligned with respect to the substrates. When an electric field is created by applying a voltage between the electrodes, the liquid crystal molecules are inclined to be tilted in a homogeneous direction with respect to the substrates because the liquid crystal molecules respectively have a negative dielectric anisotropy. This means a liquid crystal material serves as a vertically aligned liquid crystal device. Further, the above-mentioned vertically aligned liquid crystal device includes a domain-divided liquid crystal device.

The method for fabricating a liquid crystal device according to the present invention includes the steps of: forming desired electrodes on each one side of the substrates; forming alignment films for homogeneous alignment, formed on the substrates and facing each other by a uniform space; filling a liquid crystal material including liquid crystal molecules each having a negative dielectric anisotropy in a gap formed between the alignment films; and exposing the liquid crystal molecules filled between the substrates to light from either or both sides of the substrates. The liquid crystal molecules, therefore, respectively have a negative dielectric anisotropy, so that the liquid crystal molecules tend to be tilted in a direction parallel to the substrates when an electric filed is created by the application of a voltage between the electrodes. Further, the disposition of half-tone masks on either or both sides of the substrates to expose the liquid crystal molecules to light from either or both sides of the substrates makes it possible to fabricate a domain-divided liquid crystal device.

The fabricating apparatus for a liquid crystal device comprises a pair of substrates, electrodes formed on each one side of the substrates, alignment films for homogeneous alignment, formed on the electrodes and facing each other by a uniform space, and a liquid crystal material including liquid crystal molecules each having a negative dielectric anisotropy filled in a gap formed between the alignment films, wherein the fabricating apparatus includes exposing means for exposing the liquid crystal material to light from either or both sides of the substrates. Exposure to light conducted by the exposing means allows the liquid crystal molecules each having a negative dielectric anisotropy which are oriented parallel to the substrates to be vertically oriented using alignment films for homogeneous alignment. In the wavelength of light emitted by the above-mentioned exposing means, a decomposition of the liquid crystal material and the alignment film occurs when the light having a wavelength of 400 nm or less is emitted. To avoid this, a filter to cut wavelengths of 400 nm or less is required for the exposing means. Further, in the light having a wavelength of 600 nm or more, a filter to cut wavelengths of 600 nm or more is required for the exposing means due to a temperature rise of the liquid crystal material. In addition, in the case a domain-divided liquid crystal device is fabricated, the fabricating apparatus includes half-tone masks each having a predetermined pattern.

The liquid crystal device according to the present invention is an ECB-type vertically aligned liquid crystal device using polyimide films for homogeneous alignment. With the use of polyimide films for homogeneous alignment, liquid crystal molecules have uniform vertical orientation. Further, the response time of the liquid crystal device according to the present invention is quick on the average compared to a conventional ECB-type vertical aligned liquid crystal device.

In accordance with the method for fabricating a liquid crystal device of the present invention, the manufacturing process other than a liquid crystal material having a negative dielectric anisotropy and rubbing is performed in a similar manner as the fabricating method of a TN-type liquid crystal device. Subsequently, liquid crystal molecules become vertically oriented by adding a process to expose the liquid crystal molecules included in the liquid crystal device to light, which enables the fabrication of an ECB-type vertically aligned liquid crystal device. The ECB-type vertically aligned liquid crystal device according to the present invention has a colored display feature, so that a process to arrange a color filter may be omitted.

The fabricating apparatus of the liquid crystal device according to the present invention includes a filter capable of cutting wavelengths of 400 nm or less and 600 nm or more, and an aligner capable of exposing the liquid crystal molecules to light having a wavelength of 400 nm to 450 nm from either or both sides of the liquid crystal device, so that the fabrication of ECB-type vertical aligned liquid crystal devices having polyimide films for homogeneous alignment has become possible.

The liquid crystal device of the present invention may be applicable to monitors for personal computers and televisions by combination with back lights. In addition, the liquid crystal device can be employed for projection systems and a head mounted display, and the like in combination with a transmission-type and a reflective-type small sized array devices.

BRIEF DESCRIPTION OF THE DRAWINGS

Preferred embodiments of the present invention will now be described, by way of example only, with reference to the accompanying drawings in which:

FIG. 1(a) is a front view for showing only liquid crystal molecules and a polarization axis of a polarizer. FIG. 1(b) is a cross-sectional view of the liquid crystal cells.

FIG. 3(a) shows a liquid crystal pixel pattern by assembling liquid crystal cells. FIG. 3(b) shows a mask pattern. FIG. 3(c) is a front view at the time of combination of liquid crystal cells and a mask pattern.

FIG. 8(a) shows a state in which no voltage is applied. FIG. 8(b) is a cross-sectional view for showing a state in which a voltage is applied.

DETAILED DESCRIPTION OF THE PREFERRED EMBODIMENTS OF THE INVENTION

Next, a preferred embodiment of a liquid crystal device, which is an ECB-type vertically aligned alignment device, its fabricating method, and fabricating apparatus according to the present invention will be described in detail on the basis of accompanying drawings.

The liquid crystal device of the present invention is constructed using a pair of substrates of a twisted nematic (hereinafter referred to as TN)-type liquid crystal device, transparent electrodes, and alignment films.

TN-type array substrates, reflection silicon substrates, or colored filter glass substrates are employed for the substrates of the liquid crystal device of the present invention. Transparent electrodes are formed on each one side of the substrates by a vacuum deposition method, such as evaporation or sputtering. Further, polyimide films for homogeneous alignment used in a TN-type liquid crystal device are applied onto the transparent electrodes as alignment films. The burning conditions of the polyimide films for homogeneous alignment are similar to those of the TN-type liquid crystal device. For one thing, polyimide films for homogeneous alignment (soluble polyimide) in the market can be burned at about 180.

Figure 1A:
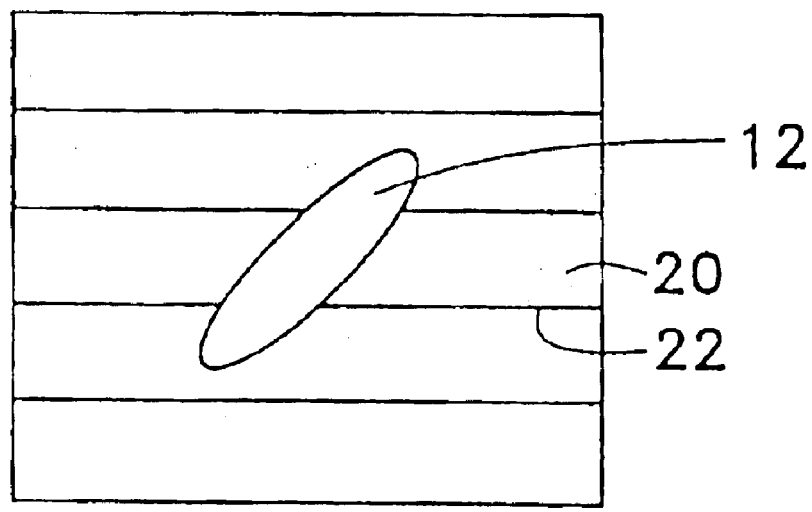
FIGS. 1(a) and 1(b) are schematic diagrams for showing the state when a liquid crystal material is sealed in liquid crystal cells according to the present invention.

And then a rubbing is conducted with respect to the polyimide films for homogeneous alignment. The rubbing conditions are roughly similar to those of the TN-type liquid crystal device. When the substrates are assembled to seal a gap between the substrates by filling with a liquid crystal material in a direction where the rubbing direction is the same as that of the TN-type liquid crystal device, liquid crystal molecules are, however, consecutively twisted by 90 degrees between the substrates like the TN-type liquid crystal device, so that in the present invention, only the rubbing direction is assumed to be that of the ECB-type vertically aligned alignment film. In the case of a general ECB-type vertically aligned liquid crystal device, when a voltage is applied between the transparent electrodes, the longer axes of the liquid crystal molecules form about 45 degrees to polarization axes of polarizers as well as conducting a rubbing in such a manner that the liquid crystal molecules are parallel to each other (FIG. 1(a)). Further, in FIGS. 1(a) and 1(b), the situation when a liquid crystal material is sealed in liquid crystal cells is illustrated, but polarizers 20 may be disposed on the opposite side of each of the electrodes after exposure which will be described later.

Although the TN-type liquid crystal device employs a liquid crystal material each having a negative dielectric anisotropy, however, in the present invention, the liquid crystal material including liquid crystal molecules each having a negative dielectric anisotropy is filled between the substrates to be sealed. Subsequently, a heating treatment for realignment and a cooling treatment are conducted on the liquid crystal material, where the treatment conditions are similar to those of the TN-type liquid crystal device. For one example, a liquid crystal material is heated after being sealed, and then the liquid crystal material is changed into a liquid state. After that, it returns to be a liquid crystal state by cooling.

Figure 1B:
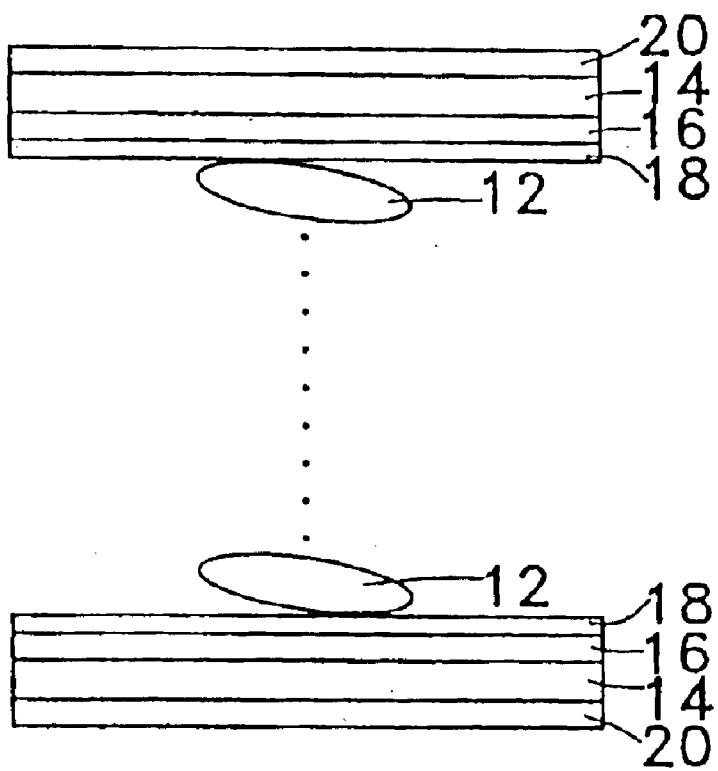

When only re-alignment heating and cooling treatments are conducted by filling a liquid crystal material each having a negative dielectric anisotropy between the substrates, as shown in FIG. 1(b), little change is caused by an electric field because liquid crystal molecules 12 are substantially oriented parallel to substrates 14 by alignment films 18, so that the liquid crystal molecules 12 in this state are unable to be used for a display device. This indicates that even if a voltage is applied onto a gap between the transparent electrodes to create an electric field which is vertical to the transparent electrodes, the liquid crystal material with a negative dielectric anisotropy having the property of aligning in a direction perpendicular to the direction of the electric field little changes the orientation of the liquid crystal molecules 12 substantially parallel to the substrates 14.

In the present invention, therefore, to make the orientation of the liquid crystal molecules 12 substantially perpendicular to the substrates 14, light is illuminated (exposure to light) from either (preferably the entire surface of one side) or both sides of the substrates (preferably the entire surface of both sides). This exposure to light utilizes the property of pretilt angles of the liquid crystal molecules being changed by light illumination. To avoid the decomposition of polyimide films for homogeneous alignment and liquid crystal material, among the wavelengths of exposed light, wavelengths of 400 nm or less are preferably cut with a filter, or the like, or light excluding wavelengths of 400 nm or less is preferably used. Further, the wavelengths of 600 nm or more are preferably cut with a filter, or the like, or light excluding wavelengths of 600 nm or more are preferably used to prevent the temperature of a liquid crystal device from rising. In addition, blue colored light (400 nm to 450 nm) is preferably included to shorten the required exposure time.

Figure 5:
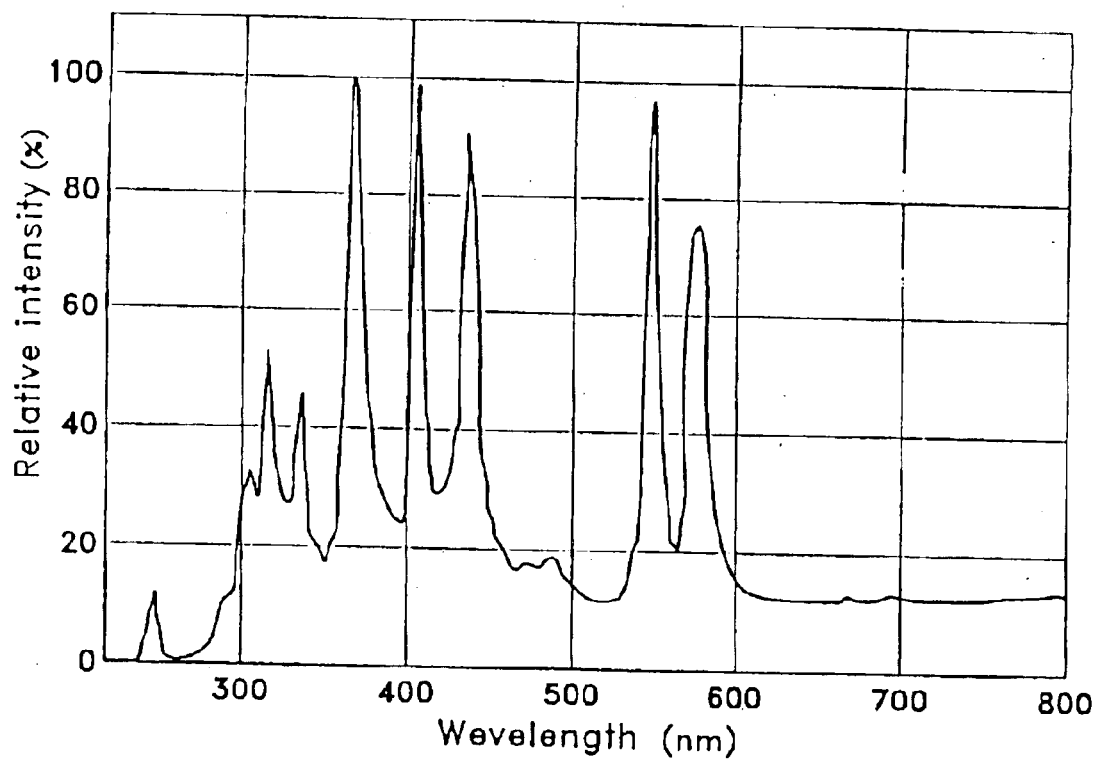
FIG. 5 shows a spectrum of PHOENIX 270W DC NTP, a metal halide lamp made by PHOENIX Electric (color temperature is 6554K, X and Y values of color coordinates are respectively 0.3127 and 0.3231, light beam is 137131 m, and electrode gap is 1.58 mm).

For example, when a metal halide lamp having a spectrum as shown in FIG. 5, PHOENIX 270W DC NTP made by PHOENIX Electric, it is noticeable that light with wavelengths of 400 nm or less is included in the above-mentioned metal halide lamp due to existence of a spectrum with wavelengths of 400 nm or less. Accordingly, the wavelengths of 400 nm or less are preferably cut with a filter, or the like to avoid the decomposition of the polyimide films for homogeneous alignment and the liquid crystal material. In addition, FIG. 5 illustrates that the above metal halide lamp includes light having wavelengths of 600 nm or less due to the existence of the spectrum having wavelengths of 600 nm or more. Consequently, it is preferable to cut the wavelengths of 600 nm or more with a filter, or the like so as to avoid a temperature rise of the liquid crystal device. Further, in the above metal halide lamp, its color temperature is 6554K, X and Y values of its color coordinates are respectively 0.3127 and 0.3231, the deviation from black body radiation locus is +0.0001, its light beam is 137131 m, and its electrode gap is 1.58 mm.

Figure 6:
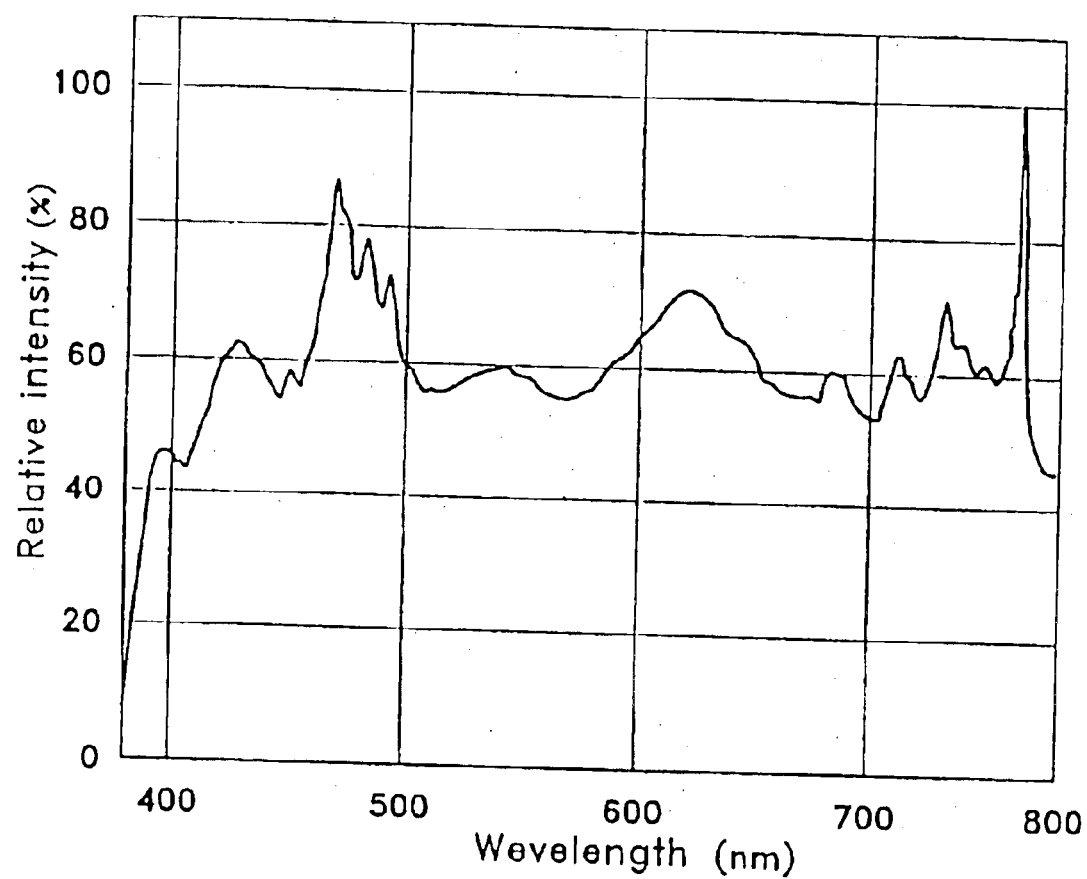
FIG. 6 shows a spectrum of a Cermax Xe Lamp, a xenon lamp made by ILC Technology which was measured by Minolta CS1000 (color temperature is 5346K, X and Y values of color coordinates are respectively 0.3348 and 0.3232, deviation from the black body radiation locus is −0.0106, illumination intensity is 57.4 W/cm$^2$ (lamp power 430 W).

In the present invention, a liquid crystal device was exposed to light using a Cermax Xe Lamp made by ILC Technology, which was a xenon lamp having a spectrum as shown in FIG. 6. The spectrum shown in FIG. 6 was measured in a state of cutting wavelengths of 370 nm or less with a filter. Further, in the above xenon lamp, the color temperature is 5346K, X and Y values of the color coordinates are respectively 0.3348 and 0.3232, the deviation from black body radiation locus is −0.0106, and the illumination intensity is 57.4 W/cm$^2$ (lamp power 430 W).

Figure 7:
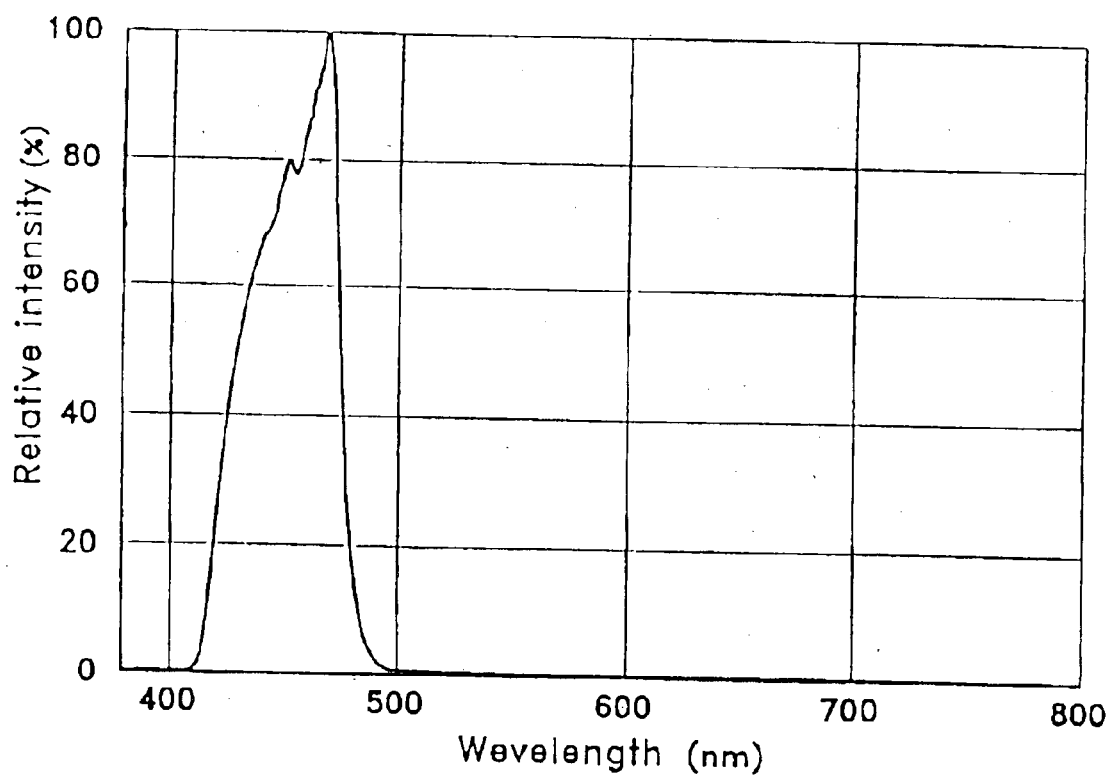
FIG. 7 shows a spectrum obtained when wavelengths of a xenon lamp having the spectrum shown in FIG. 6, which are 420 nm or less and 500 nm or more, are cut using a filter for cutting wavelengths of 420 nm or less and a separation dichroic mirror in green and blue, and its X and Y values of color coordinates are respectively 0.148 and 0.0301 and illumination intensity is about 19 W/cm$^2$ (lamp power 430 W).
Figure 8A:
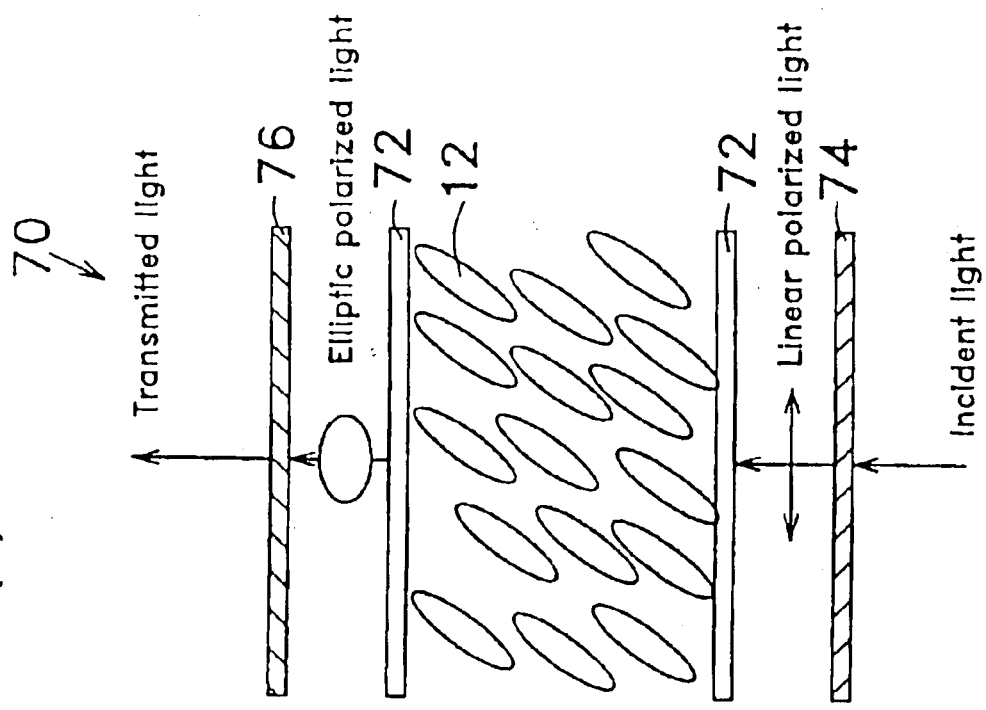
FIGS. 8(a) and 8(b) are cross-sectional views for respectively showing an electro-optical effect of an ECB-type vertical aligned liquid crystal device.
Figure 8B:
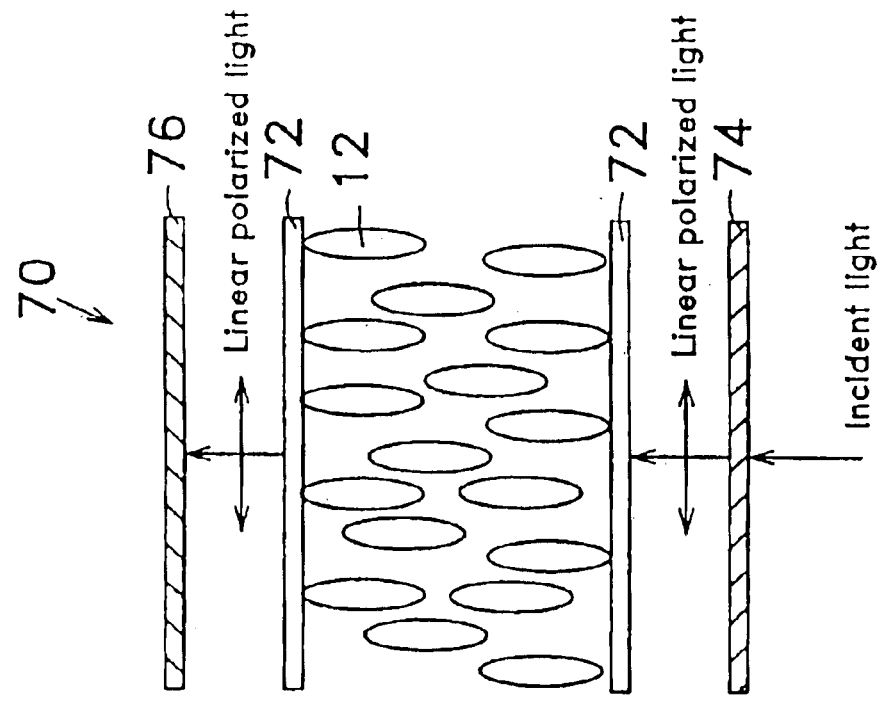

A spectrum having wavelengths of 400 nm or less and 600 nm or more exists in FIG. 6, so that these wavelengths should be respectively cut by a filter to apply light onto a liquid crystal material. In the present invention, light whose wavelengths of 420 nm or less and about 500 nm or more have been cut is illuminated on each of the liquid crystal material using a filter for cutting wavelengths of 420 nm or less and a separation dichroic mirror in green and blue. FIG. 7 shows the spectrum of a xenon lamp at that time. Further, X and Y values of the color coordinates at the time of exposure are respectively 0.1486 and 0.0301, and the illumination intensity is about 19 W/cm$^2$ (lamp power 430 W). When the application of light is performed onto the liquid crystal material under the above conditions, the liquid crystal material became vertically aligned as required by exposing it to light for about 40 to 50 hours. Furthermore, the spectrums shown in FIGS. 6 and 7 were measured by MINOLTA CS1000 (Minolta).

In the case of a liquid crystal device on which substrates metallic chrome films are formed as shielding masks (black matrix) by the sputtering method, when exposure is performed from the substrate side having a shielding mask, a portion of the liquid crystal device where light is not illuminated remains to be homogeneously aligned due to cut of light by the shielding masks. Accordingly, performing exposure from the substrate side without shielding masks or from both substrate sides enables an exposure of all of the liquid crystal molecules.

Figure 2:
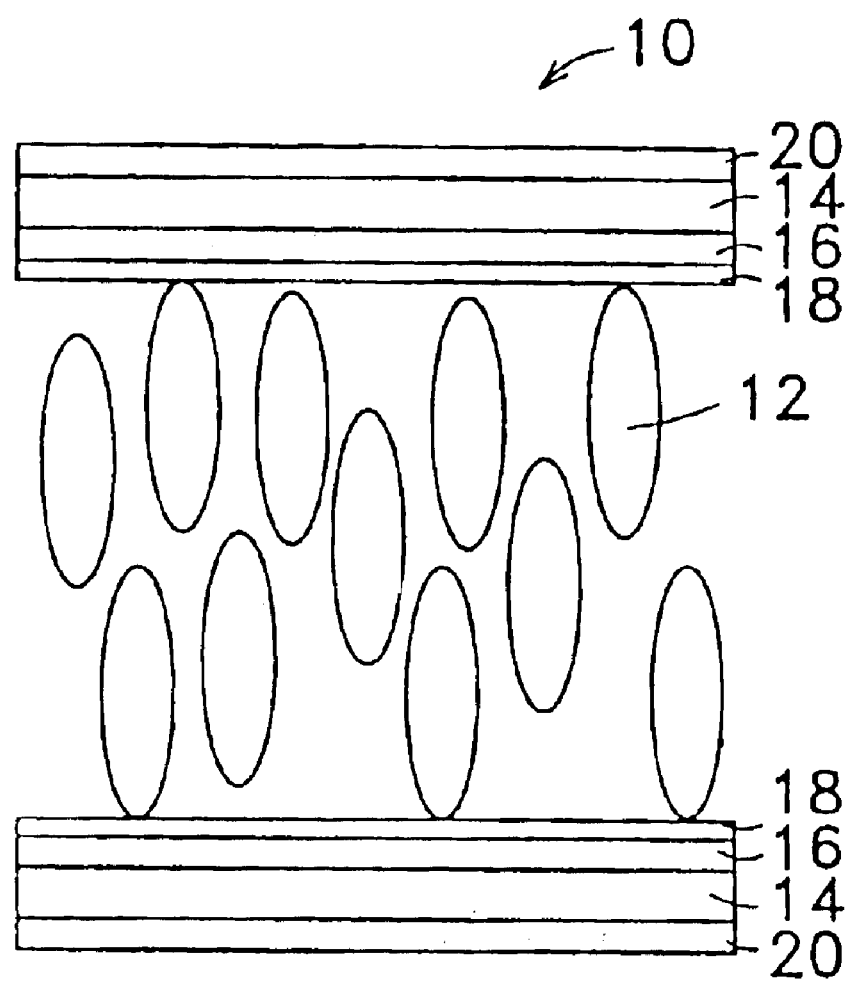
FIG. 2 is a schematic diagram for showing the state that the liquid crystal molecules are vertically oriented by exposing to light.

As described above, in the liquid crystal device which was fabricated under the above manufacturing conditions, the liquid crystal molecules are oriented parallel to the substrates by polyimide films for homogeneous alignment. Pretilt angles of the liquid crystal molecules are, however, gradually becoming larger by the above-mentioned light illumination, so that as finally shown in FIG. 2, the liquid crystal device becomes vertically aligned with respect to the substrates. The vertically oriented liquid crystal molecules tend to be tilted-in the direction of a rubbing by applying a voltage between the transparent electrodes. The change of wavelength dispersion characteristics in birefringence of the liquid crystal material enables to change the quantity of transmitted light. Since the color of transmitted light varies, color display is possible. This color display can change the displayed color without using any color filters. This indicates that the liquid crystal device which has been manufactured according to the present invention serves as an ECB-type vertically aligned liquid crystal device.

FIG. 1 shows response time of the liquid crystal device manufactured by the above method. "Response time" is a duration when the illuminance varies from 10 to 90% after a driving signal (voltage) for driving the liquid crystal device has turned ON or OFF. According to TABLE 1, each of the response time of the liquid crystal device of the present invention is faster than 20 ms. TABLE 2 shows the response time of an ECB-type vertically aligned liquid crystal device in the prior art, but there is extremely slow response time (70 ms) and embodiments of the response time of variations in driving voltage (driving signal) itself is variant. On the contrary, in the liquid crystal device according to the present invention shown in TABLE 1, it is obvious that regardless of how the driving signal varies, quick response time is obtained on average. When the liquid crystal device of the present invention is used as a liquid crystal display apparatus, the display quality is improved, so that unlike the prior art, there is no delay in displaying the entire images or partial images, such as display of moving images, or the like.

TABLE 1

| Variations of Driving Voltage | Response Time |
|---|---|
| 0 V → 4.0 V | 5.4 ms |
| 0 V → 2.5 V | 18.3 ms |
| 0 V → 2.0 V | 19.8 ms |
| 0 V → 1.7 V | 17.0 ms |
| 0 V → 1.4 V | 17.4 ms |
| 4.0 V → 0 V | 9.1 ms |
| 2.5 V → 0 V | 8.4 ms |
| 2.0 V → 0 V | 11.1 ms |
| 1.7 V → 0 V | 11.9 ms |
| 4.0 V → 2.5 V | 15.6 ms |
| 4.0 V → 2.0 V | 15.5 ms |

TABLE 2

| Variations of Driving Voltage | Response Time |
|---|---|
| 0 V → 2.5 V | 70 ms |
| 0 V → 3.5 V | 30 ms |
| 0 V → 4.0 V | 25 ms |
| 3.0 V → 0 V | 2.5 ms |
| 4.0 V → 0 V | 3 ms |
| 4.0 V → 2.5 V | 11 ms |
| 4.0 V → 3.0 V | 12 ms |

The embodiments of the liquid crystal device and a fabricating method, and a fabricating apparatus thereof according to the present invention have been described so far, but the present invention is not limited to these embodiments.

Figure 3A:
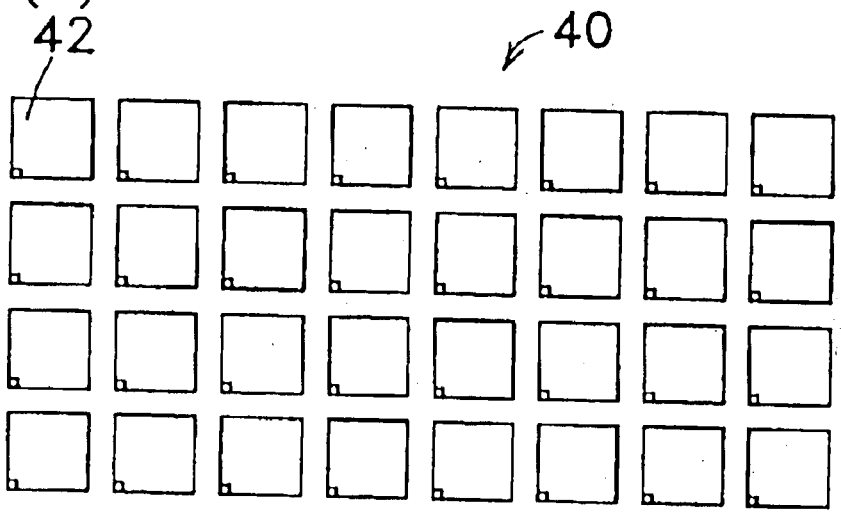
FIGS. 3(a) through 3(c) are front views at the time of domain division (multi-domains).
Figure 3B:
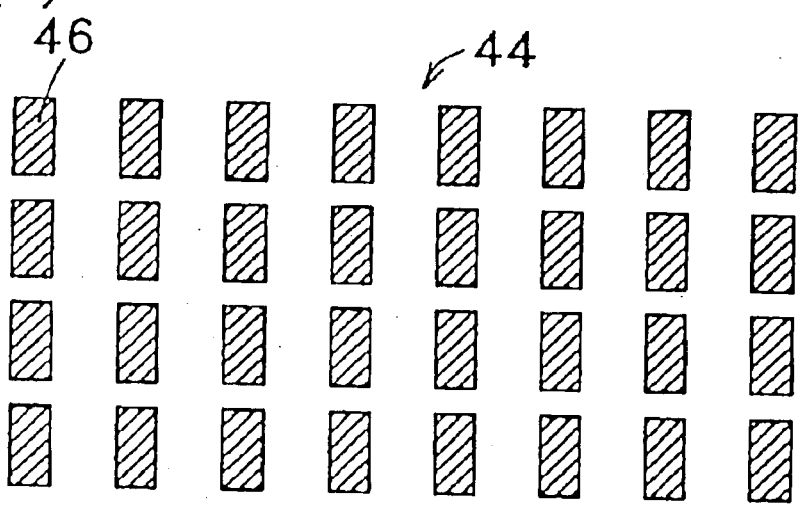
Figure 3C:
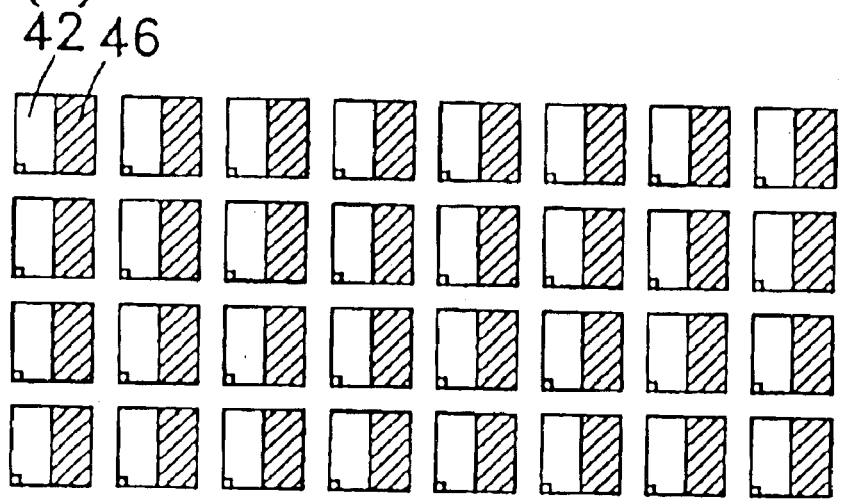

The present invention may be used for performing a domain division (Multi-domain) to improve a viewing angle as the other embodiment. Each of liquid crystal cells 42 shown in FIG. 3(*a*) is exposed to light in a similar manner as the above method. Each of the liquid crystal cells 42 is not exposed to light from either (preferably the entire surface of one side) or both sides of the substrates (preferably the entire surfaces of both sides) of the liquid crystal cells 42, but as shown in FIG. 3(*c*), the liquid crystal cells 42 are exposed to light after the superimposition of half-tone masks 46 shown in FIG. 3(*b*) on the entire surface of one side or the entire surfaces of both sides of the substrates of each of the liquid crystal cells 42. This exposure divides each of the liquid crystal cells 42 into a portion having 100% of light exposure and a portion in which the light exposure is reduced using the half-tone masks 46. This means the domain of each of the liquid crystal cells 42 are divided. When a liquid crystal device contains shielding masks (black matrix), the half-tone masks 46 are superimposed on the substrate side without shielding mask (preferably the entire substrate side) to perform the above-mentioned exposure. In addition, chromium, or the like is employed as an example of material for the half-tone masks 46.

Figure 4:
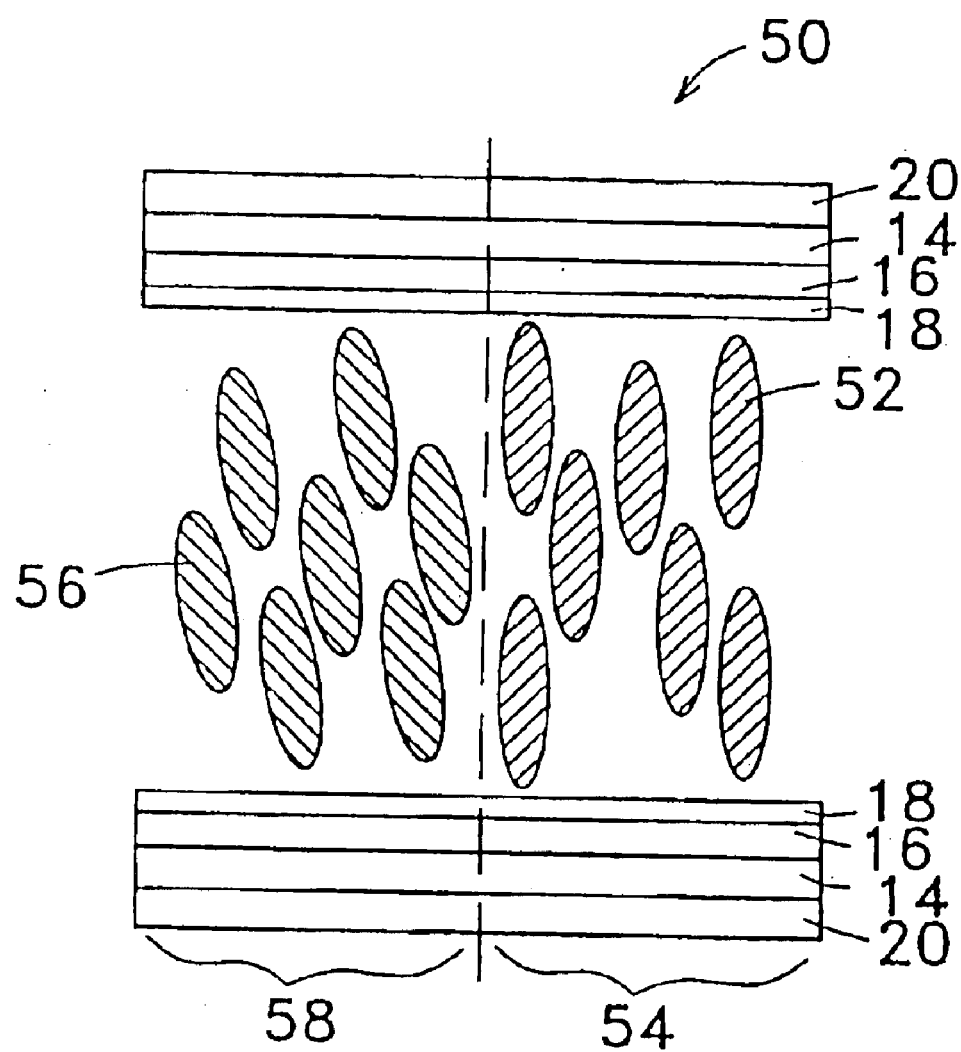
FIG. 4 is a cross-sectional view for showing the liquid crystal cells wherein their domain has been divided as shown in FIGS. 3(a) through 3(c).

As shown in FIG. 4, each of the pretilt angles of the liquid crystal molecules in a region 58 (weakly exposed region), in which exposure is weakened by the half-tone masks 46, is about 86 to 87 degrees. Each of the pretilt angles of the liquid crystal molecules in a region 54 (strongly exposed region), in which exposure is conducted without being shielded by the half-tone masks 46, is about 88 to 89 degrees. Two kinds of pretilt angles exist within one liquid crystal cell, and a combination of these two kinds of pretilt angles leads to the effect of improving the viewing angle. In addition, although domain division was conducted to obtain a two-part split cells in FIGS. 3 and 4, a three-part split is also possible. Further, when exposure is performed from the both sides of the liquid crystal device, the half-tone masks 46 may be superimposed on the both sides of the liquid crystal device.

Also, any modification, variations or equivalent arrangements which may occur to those skilled in the art should be considered to be within the scope of the invention.

There has thus been shown and described Liquid Crystal Device, Fabricating Method, and Fabricating Apparatus thereof which fulfills all the objects and advantages sought therefor.

While the invention has been particularly shown and described with respect to preferred embodiments thereof, it will be understood by those skilled in the art that the foregoing and other changes in form and details may be made therein without departing form the spirit and scope of the invention.

Having thus described our invention, what we claim as new, and desire to secure by Letter Patent is:

1. A method for fabricating a liquid crystal device including the steps of:
   forming desired electrodes on each one side of substrates;
   forming alignment films for homogeneous alignment, formed on said electrodes and facing each other by a uniform space;
   filling a liquid crystal material including liquid crystal molecules each having a negative dielectric anisotropy in a gap formed between the alignment films; and
   exposing the liquid crystal molecules filled between said substrates to light
   wherein said step of exposing liquid crystal molecules to light is used for controlling liquid crystal molecules so that said liquid crystal molecules may be vertically oriented with respect to said substrates.

2. The method for fabricating a liquid crystal device according to claim 1, wherein said step of exposing liquid crystal molecules to light is used for illuminating said liquid crystal material from either or both sides of said substrates.

3. The method for fabricating a liquid crystal device according to claim 1, further including step of cutting light with wavelengths of 400 nm or less and/or 600 nm or more before said step of exposing liquid crystal molecules to light.

4. The method for fabricating a liquid crystal device according to claim 3, wherein said light used for exposure includes a wavelength in a range from 400 nm 450 nm.

5. A method for fabricating a liquid crystal device including the steps of:
   forming desired electrodes on each one side of substrates;
   forming alignment films for homogeneous alignment, formed on said electrodes and facing each other by a uniform space;
   filling a liquid crystal material including liquid crystal molecules each having a negative dielectric anisotropy in a gap formed between the alignment films; and
   exposing the liquid crystal molecules filled between said substrates to light by disposing masks in a prescribed region of either or both sides of each of the substrates
   wherein said step of exposing liquid crystal molecules to light is used for controlling liquid crystal molecules so that said liquid crystal molecules may be vertically oriented with respect to said substrates.

6. The method for fabricating a liquid crystal device according to claim 5, wherein said step of exposing liquid crystal molecules to light is used for illuminating said liquid crystal material from either or both sides of said substrates.

7. The method for fabricating a liquid crystal device according to claim 5, further including a step of cutting light with wavelengths of 400 nm or less and/or 600 nm or more before said step of exposing liquid crystal molecules to light.

8. The method for fabricating a liquid crystal device according to claim 7, wherein said light used for exposure includes a wavelength in a range from 400 nm to 450 nm.

9. The method for fabricating a liquid crystal device according to claim 5, wherein said masks include half-tone masks.

10. A fabricating apparatus for a liquid crystal device comprising:
    a pair of substrates,
    electrodes formed on each one side of said substrates;
    alignment films for homogeneous alignment, formed on said electrodes and facing each other by a uniform space; and
    a liquid crystal material including liquid crystal molecules each having a negative dielectric anisotropy, said liquid crystal material filled in a gap formed between the alignment films,
    wherein the fabricating apparatus includes exposing means for exposing said liquid crystal material to light from either or both sides of said substrate
    wherein said step of exposing liquid crystal molecules to light is used for controlling liquid crystal molecules so that said liquid crystal molecules may be vertically oriented with respect to said substrates.

11. The fabricating apparatus for a liquid crystal device according to claim 10, wherein said exposing means emits light having a wavelength in a range from about 400 nm to 450 nm.

12. The fabricating apparatus for a liquid crystal device according to claim 10, wherein said exposing means is equipped with a filter for cutting wavelengths to 400 nm or less and/or 600 nm or more.

13. A fabricating apparatus for a liquid crystal device comprising:

a pair of substrates, electrodes formed on each one side of said substrates;

alignment films for homogeneous alignment, formed on said electrodes and facing each other by a uniform space; and a liquid crystal material including liquid crystal molecules each having a negative dielectric anisotropy, said liquid crystal material filled in a gap formed between the alignment films, wherein the fabricating apparatus includes means for disposing masks in a prescribed region of either or both sides of said substrates and exposing means for exposing said liquid crystal material to light from either or both sides of the substrates wherein said step of exposing liquid crystal molecules to light is used for controlling liquid crystal molecules so that said liquid crystal molecules may be vertically oriented with respect to said substrates.

14. The fabricating apparatus for a liquid crystal device according to claim 13, wherein said exposing means emits light having a wavelength in a range from 400 to 450 nm.

15. The fabricating apparatus for a liquid crystal device according to claim 13, wherein said exposing means is equipped with a filter for cutting wavelengths of 400 nm or less and/or 600 nm or more.

16. The fabricating apparatus for a liquid crystal device according to claim 13, wherein said masks include half-tone masks.

* * * * *